United States Patent
Escola Puig-Corve

(10) Patent No.: US 9,221,107 B2
(45) Date of Patent: Dec. 29, 2015

(54) DRILLING/CLAMPING DEVICE

(76) Inventor: Alejandro Escola Puig-Corve, Barcelona (ES)

( * ) Notice: Subject to any disclaimer, the term of this patent is extended or adjusted under 35 U.S.C. 154(b) by 0 days.

(21) Appl. No.: 12/919,275

(22) PCT Filed: Dec. 16, 2008

(86) PCT No.: PCT/ES2008/000781
§ 371 (c)(1),
(2), (4) Date: Nov. 4, 2010

(87) PCT Pub. No.: WO2009/106651
PCT Pub. Date: Sep. 3, 2009

(65) Prior Publication Data
US 2011/0036964 A1    Feb. 17, 2011

(30) Foreign Application Priority Data
Feb. 25, 2008   (ES) ................. 200800381 U

(51) Int. Cl.
*F16M 13/00*   (2006.01)
*B23B 45/02*   (2006.01)
*E04H 12/22*   (2006.01)
*A45B 23/00*   (2006.01)
*A45F 3/44*    (2006.01)

(52) U.S. Cl.
CPC ............ *B23B 45/02* (2013.01); *E04H 12/2223* (2013.01); *E04H 12/2269* (2013.01); *A45B 2023/0012* (2013.01); *A45F 3/44* (2013.01)

(58) Field of Classification Search
CPC .. B23B 45/02; A45B 2023/0012; A45F 3/44; E04H 12/2223; E04H 12/2269
USPC ............ 248/545, 156, 522, 530; 135/16, 157; 52/156, 157
See application file for complete search history.

(56) References Cited

U.S. PATENT DOCUMENTS

| | | | | |
|---|---|---|---|---|
| 4,803,812 A * | 2/1989 | Alexander, Sr. | ................ | 52/157 |
| 5,034,572 A * | 7/1991 | Kouno et al. | ................ | 200/5 R |
| 5,152,495 A | 10/1992 | Jacinto | | |
| 5,156,369 A * | 10/1992 | Tizzoni | ................ | 248/545 |
| 7,497,225 B1 * | 3/2009 | Klein et al. | ................ | 135/16 |
| 7,942,377 B2 * | 5/2011 | Harold et al. | ................ | 248/545 |
| 2005/0040297 A1 | 2/2005 | Saraf | | |
| 2005/0211282 A1 * | 9/2005 | DeVenezia et al. | ............ | 135/16 |
| 2008/0092936 A1 * | 4/2008 | Carabillo | ................ | 135/16 |

FOREIGN PATENT DOCUMENTS

| | | |
|---|---|---|
| ES | 1060034 | 7/2005 |
| ES | 1064102 | 2/2007 |
| FR | 2772412 | 6/1999 |
| FR | 2799486 | 8/2010 |
| WO | 0162117 | 8/2001 |
| WO | 2008001319 | 1/2008 |

\* cited by examiner

*Primary Examiner* — Amy Sterling
(74) *Attorney, Agent, or Firm* — MU Patents; Timothy Marc Shropshire

(57) ABSTRACT

The invention relates to a drilling/clamping device including a base body which can be extracted from the shaft or rod, provided at one end with a drilling head actuated by means of an electric motor housed inside the base body. The base body also includes means for coupling to the shaft or rod, provided with means for actuating an electrical contactor element in order to actuate the electric motor. In addition, a rising/falling pivoted connection is provided between the coupling means and the base body, such that, when pressure is applied to the rod or shank the coupling means move axially and abut against the contactor element associated with the electric motor, thereby starting the electric motor.

3 Claims, 2 Drawing Sheets

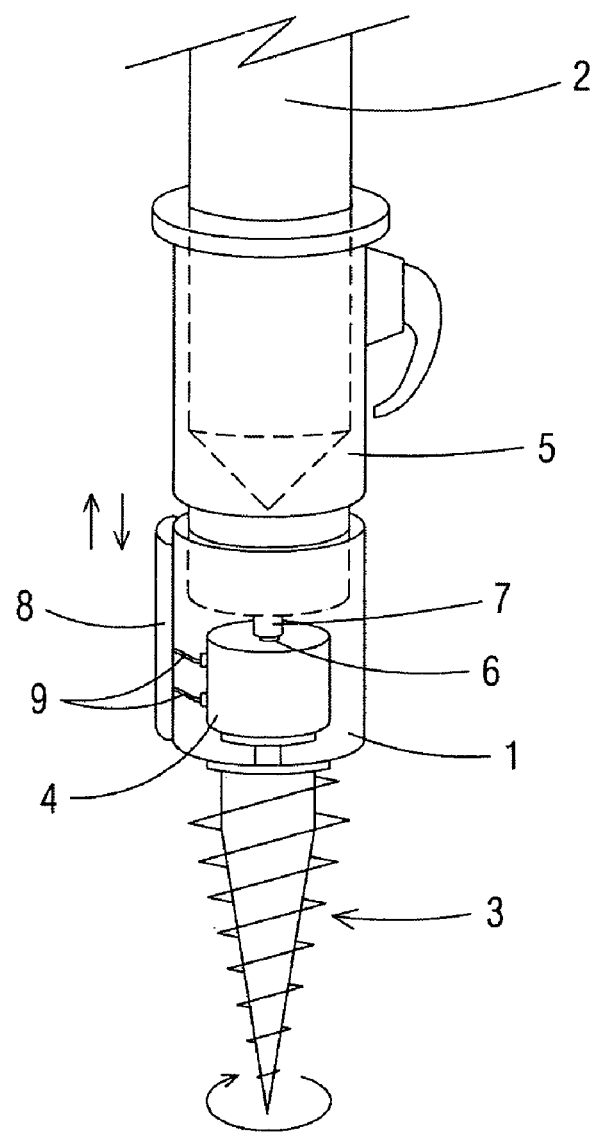

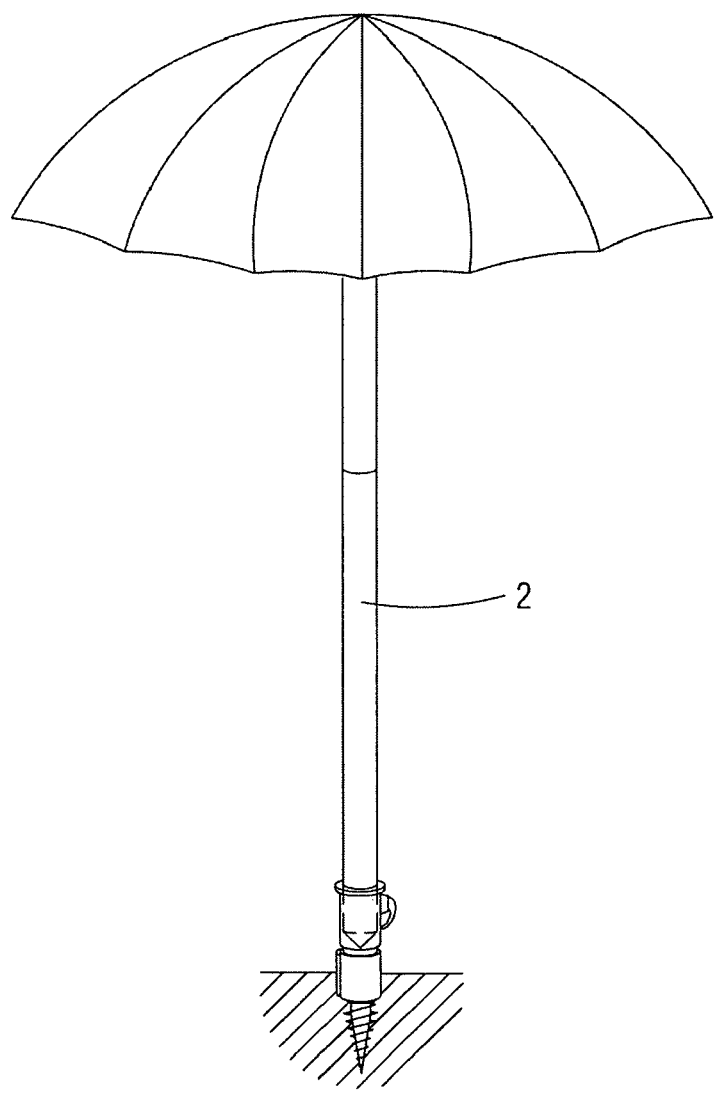

DRILLING/CLAMPING DEVICE

OBJECT OF THE INVENTION

The present invention is related to a drilling-clamping device, in particular for shafts, sun shade rods which generally includes appreciable innovations and advantages.

More specifically, the invention refers to a drilling-clamping device, in particular for shafts, sun shade rods and in general, which comprises a base body, of the type that is removable from the shaft or rod, provided with a drilling head at one end, allowing it to be fixed in a convenient, quick and effective manner.

BACKGROUND OF THE INVENTION

At the present time various solutions are known for the fixing or clamping of sunshades into the ground which basically consist of the placing of an accessorial device at the lower part of the sunshade shank, such as the devices described in the Utility Model n° ES 1064102 or ES 1060034 the object of which are to make it easier for the user to fix the sunshade into the ground.

However, none of the devices or supports known to the applicant consider the existence of an invention that has the characteristics that are described in this description, as in all of the known devices the insertion is carried out in a manual manner hence it requires some strength, thus its use is limited for those people who have physical problems (backaches, etc.) or people of advanced age.

DESCRIPTION OF THE INVENTION

The invention has been developed for the purpose of providing a drilling-clamping device that solves the above mentioned disadvantages, in addition contributing other additional advantages which will become clear from the description which follows.

Therefore the object of the present invention is to provide a drilling clamping device in particular for shafts, sun shade rods and in general, of the type that comprises a base body, being of extractable type in regard to the shaft or rod, which is provided with a drilling head at one end, that is characterised in that the drilling head is actuated by means of an electric motor that is housed inside the base body, including the base body means for coupling to the shaft or rod, provided with means for actuating of an electrical contactor element in order to actuate the electric motor, so that a rising/falling pivoted connection is provided between the coupling means and the base body in such a way that when pressure is applied to the rod or shank the coupling means moves axially abutting against the contactor element associated with the electric motor, thereby starting up said electric motor.

Thanks to these characteristics, an original device is provided that makes the placement easier, for example, for sunshade or shanks for the setting up of marquees, thus making the placement significantly easier for the user as by pressing the shank or rod down slightly the drilling head turns pushing the point into the ground sufficiently deeply so as to prevent it from coming away in an undesirable manner from the action of the wind. The provision of the driving has the advantage of not requiring an external push button so as to activate it as the axial movement is enough to activate or stop the electric motor.

The fact that the device can be extracted provides it with greater versatility as it can be used to fix differing elements such as beach sunshades, support rods for marquees.

Another advantage, nonetheless important, is the fact that in addition to fixing shafts, the device described above can be used to make holes in the ground, for example, so as to carry out gardening tasks.

Preferably, the coupling means consists of an internally hollow tube for the insertion of the shaft or shank which includes at its bottom end a protrusion that abuts against the electrical contact.

In an advantageous manner, the electric motor of the fixing device is associated with an accumulator of rechargeable battery in such a way that it can easily be charged up.

In a preferred embodiment, the drilling head consists of a conical threaded shank associated to an axle actuated by the electric motor, although it could use another type of head that has other similar purposes.

Other characteristics and advantages of the drilling clamping device object of the present invention will become clear from a description of a preferred embodiment, but it is not exclusive, the drawings that are attached are by way of illustration but without being in any way limiting.

BRIEF DESCRIPTION OF THE DRAWINGS

FIG. 1.—It is a diagrammatic and partially sectioned view in perspective of the drilling/clamping device according to the invention; and FIG. 2.—it is an elevation view of a practical application of the drilling/clamping device of the invention.

DESCRIPTION OF A PREFERRED EMBODIMENT

As shown in a preferred embodiment of the drilling-clamping/device of the invention with regard to FIGS. 1 and 2, said device which is very useful for shafts, rods of sunshades, marquees, etc., comprises a base body (1) that is hermetically made from a suitable material such as metal or plastic, being able to be extracted from the shaft or rod (2), provided at one end with a drilling head (3), the drilling head (3) is actuated by means of an electric motor (4) housed inside the body base (1) (the motor can be of any standard type that is available on the market), the base body including means for coupling the shaft or rod provided with means for actuating of an electrical contactor element (6) so as to activate the electric motor (4), so that a rising/falling pivoted connection is provided between the coupling means and the base body (1) as shown by the arrows in FIG. 1, in such a way that on applying downward pressure the rod or shank (2) moves the coupling means axially abutting the contactor against the electric motor (4), with the resulting turning of the axle connected to the drilling head (3).

Said coupling means consists of an internally hollow tubular body (5) for the insertion of the rod or shank (2) which at the end includes a protrusion (7) that abuts against the electric contactor element (6) in such a way that when it abuts it activates the stated electric motor (4).

In an additional manner, the electric motor (4) is connected to an accumulator of rechargeable battery (8) located laterally with the base body (1) that can be connected to a known form of electrical energy, the connection between the battery (8) and the electric motor (4) being by means of conventional types of electrical connections (9).

The details, shapes, sizes and other accessorial elements, likewise the materials used in the manufacture of the drilling/clamping device of the invention can be appropriately substituted by others that are technically equivalent and do not stray away from the essentiality of the invention or the scope defined by the claims that are included below.

The invention claimed is:

1. A drilling-clamping device, comprising:
   a. a base body;
   b. an electric motor housed within the base body;
   c. a drilling head;
   d. an axle, wherein the electric motor and the drilling head are connected by the axle;
   e. an electrical contactor element on a top surface of the electric motor;
   f. a hollow tubular body configured to engage with the base body, wherein the hollow tubular body has a protrusion at a lower end, the protrusion being configured to engage with the electrical contactor element, and wherein an upper end of the hollow tubular body is configured to receive a shaft;
   g. a battery; and
   h. an electrical connection from the battery to the electric motor, wherein the shaft, the hollow tubular body, the electric motor, the base body, and the drilling head are axially aligned, wherein application of axial pressure on the shaft is configured to connect the protrusion of the tubular body with the electrical contactor element, wherein said connection is configured to activate the electric motor and turn the axle.

2. The drilling-clamping device of claim 1, wherein the hollow tubular body further comprises a releasable tensioning device configured to securingly engage the shaft and prevent axial or rotational movement of the shaft.

3. The drilling-clamping device of claim 1, wherein the base body is pivotably connected to the hollow tubular element.

* * * * *